(12) United States Patent
Faith et al.

(10) Patent No.: US 8,020,764 B2
(45) Date of Patent: Sep. 20, 2011

(54) AUTHENTICATION USING PHYSICAL CHARACTERISTICS OF TOKENS

(75) Inventors: Patrick Faith, Pleasanton, CA (US); Mark Carlson, Half Moon Bay, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 12/854,466

(22) Filed: Aug. 11, 2010

(65) Prior Publication Data

US 2011/0049233 A1 Mar. 3, 2011

Related U.S. Application Data

(63) Continuation of application No. 12/414,165, filed on Mar. 30, 2009, now Pat. No. 7,793,837.

(51) Int. Cl.
*G06K 5/00* (2006.01)
*G06F 17/00* (2006.01)
(52) U.S. Cl. ........................................ 235/382; 235/375
(58) Field of Classification Search ........... 235/375.382, 235/487, 492
See application file for complete search history.

(56) References Cited

U.S. PATENT DOCUMENTS

| | | | |
|---|---|---|---|
| 6,193,156 B1 | 2/2001 | Han et al. | |
| 6,760,472 B1 * | 7/2004 | Takeda et al. | 382/149 |
| 6,769,616 B2 | 8/2004 | Fu et al. | |
| 7,497,379 B2 | 3/2009 | Chen et al. | |
| 7,793,837 B1 * | 9/2010 | Faith et al. | 235/382 |
| 2003/0112118 A1 | 6/2003 | Raslan | |
| 2006/0267230 A1 | 11/2006 | Rha et al. | |
| 2008/0149700 A1 | 6/2008 | Tuyls et al. | |

FOREIGN PATENT DOCUMENTS
WO   WO 02/50790 A1   6/2002

\* cited by examiner

*Primary Examiner* — Michael G Lee
*Assistant Examiner* — Matthew Mikels
(74) *Attorney, Agent, or Firm* — Kilpatrick Townsend & Stockton LLP (57) ABSTRACT

A point of issuance cracking device for producing and recording intentionally created unique crack patterns in a brittle material layer of portable consumer devices and methods of using same for authentication are disclosed. When a conductive material is used for the brittle material layer, the electromagnetic field (EMF) signature of the intentionally created cracks can be detected, stored and compared for the purposes of the authenticating the portable consumer device.

20 Claims, 8 Drawing Sheets

AUTHENTICATION USING PHYSICAL CHARACTERISTICS OF TOKENS

CROSS-REFERENCES TO RELATED APPLICATIONS

This application is a continuation of U.S. Non-Provisional patent application Ser. No. 12/414,165, entitled Authentication Using Physical Characteristics of Tokens, filed on Mar. 30, 2009 and is incorporated herein by reference for all purposes.

BACKGROUND

As methods and devices for engaging in electronic authorizations have increased, problems such as fraud continue to persist. One way to reduce fraud in an electronic authorization is to authenticate the identification device, or other portable consumer device, used in the electronic authorization.

Some systems authenticate a portable consumer device using various forms of risk analysis and other information not imprinted or stored on the portable consumer device such as dynamic card verification values (dCVVs). In one exemplary conventional system, at the front end of the transaction (e.g. where a merchant and a consumer reside), the portable consumer device can provide information associated with the portable consumer device and the consumer such as an encrypted account number or other identification information. In addition, various forms of anti-counterfeiting measures have been made to the actual consumer devices. An example of a conventional credit card is depicted in FIGS. 1A, B and C.

Figure 1A:
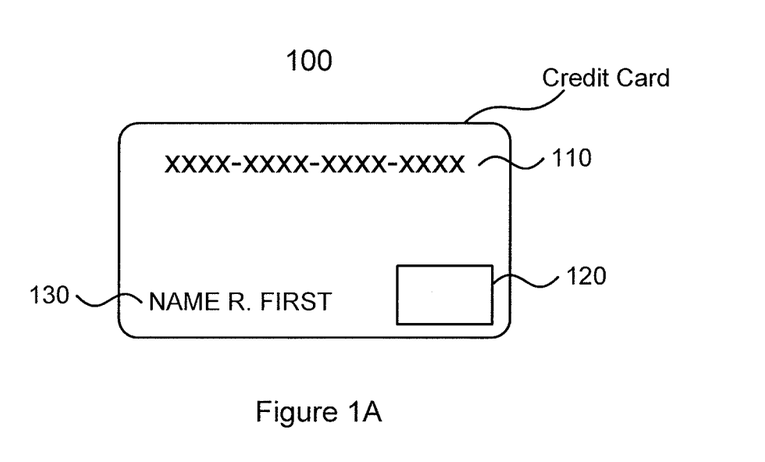
Figure 1B:
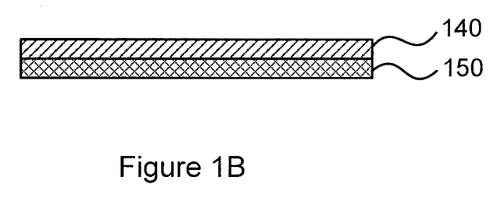
FIGS. 1B and 1C show side, cross-sectional views.
Figure 1C:
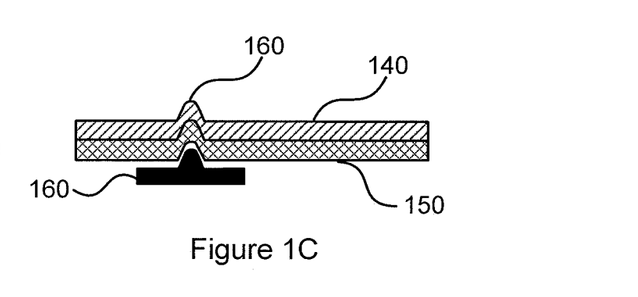

As shown in FIG. 1A, a conventional credit card 100 typically displays information such account number 110, account holder's name 130 and some type of anti-counterfeiting measure 120. Most current credit and debit cards are made of up of at least two layers. FIG. 1B shows a cross-section of a typical credit card stock comprising a substrate layer 150 and a top layer 140. Substrate layer 150 is usually a semi-rigid plastic that can be stamped or embossed. Top layer 140 is usually a print or decal identifying the issuer of the credit card and possibly other information. In most conventional credit cards, important information such as account number 110 and account holder name 130 are embossed by an embosser 160 and then painted at the apex of the embossed regions 170 to increase legibility as shown in FIG. 1C. Embossing such information serves multiple purposes: 1) embossed information is more durable than simple printing, 2) provided a means for quickly copying such information by taking an imprint of the card and 3) embossed information is more difficult to reproduce or alter and as such was a first attempt to curb counterfeiting. In addition, credit card 100 may also have a card verification value (CVV) printed on the back of that card that is not included in any computer readable medium that might be included on the card. However, improvements to existing anti-counterfeiting technologies would be desirable.

For example, anti-counterfeiting measure 120 can be a sophisticated holographic image, a watermark, micro printed designs or text, or fluorescent details that show up under ultraviolet light. The main idea in conventional physical anti-counterfeiting technology is to include a physical characteristic on the card that is too difficult or costly to reproduce. However, counterfeiters gradually catch up to each technology in time. When the counterfeiters catch up to a particular anti-counterfeiting measure, that measure becomes obsolete. Because there is only so much that conventional anti-counterfeiting technologies can protect before they are overcome, these types of physical security measures are used in conjunction with various front end and back end encryption and computer security techniques.

Using various algorithms and encryption keys, the information provided to an authentication system is protected in an encrypted form as it is transmitted from the front end of the transaction to a back end computer system. The information sent can only be unencrypted by the back end computer system when the proper encryption key is used. Due to the critical role the encryption key plays, maintaining the secrecy of the encryption keys is of utmost importance in such systems.

In addition, some conventional authentication systems require a user to enter a PIN known only to the user to authenticate the user and the portable consumer device. This provides a level of security that helps ensure that the user presenting the portable consumer device is the authorized user of that particular device. The assumption here is that the PIN will only be known by the user and will not be revealed to or discovered by someone wishing to commit fraud.

Despite the best efforts of users and issuers of portable consumer devices, account numbers, personal identifiers, PINs and encryptions keys can be stolen or discovered and then used by unauthorized parties to replicate portable consumer devices so as to defraud authentication systems. Since data can be hacked and stolen and the sophistication of unauthorized users and counterfeiters continues to increase, it is currently possible to make fraudulent cards that can be used for in-person transactions once key information is known. The fraudulent portable consumer device will appear to be an authentic device since it will have all the correct information and characteristics. An unauthorized user may have even discovered the PIN or other access code to provide when presenting the device for authentication.

It is clear that what is needed is a system, method, and device to prevent unauthorized users from creating and using fraudulent versions of portable consumer devices. Embodiments of the disclosed invention address the above problems, and other problems, individually and collectively.

BRIEF SUMMARY

Embodiments of the present invention are directed toward a point of issuance cracking device for processing a portable consumer device that can include a fissure pattern creation device for cracking a brittle material layer of the portable consumer device and a crack pattern detection system configured to detect crack patterns in the brittle material layer of the portable consumer device. The crack pattern detection system can emit or detect at least one of visible light, infrared light, ultraviolet light, polarized radiation, x-rays, sonic waves or pulses.

In various embodiments of the point of issuance cracking device, the fissure pattern creation device for cracking the brittle material layer can include a set of rollers with offset radii arranged to deform the portable consumer device as it passes through the rollers to create the cracked pattern in the brittle material layer. In other embodiments, the fissure pattern creation device for cracking the brittle material layer can include a hammer or a stamp disposed to strike the portable consumer device to crack the brittle material layer.

In other embodiments, the crack pattern detection system of the point of issuance cracking device can include a radiation source disposed to emit radiation onto one side the portable consumer device and a radiation sensor disposed to detect the radiation after it is incident on the cracked brittle material layer of the portable consumer device at the same or opposite side of the portable consumer device. The sensor can be configured to detect the transmittance or reflectance of the radiation through the cracked brittle material layer of the portable consumer device. In some embodiments, the crack pattern detection system can be configured to record crack pattern data to a memory. Furthermore, the crack pattern detection system can further be configured to associate the recorded crack pattern data with a user account identifier and store the association in the memory.

In various embodiments, the cracking device can include electrical leads for applying an electrical signal to the brittle material layer of the portable consumer device to produce an electromagnetic field and a sensor for detecting the resulting electromagnetic field. The point of issuance cracking device can include a crack pattern detection system configured to record electromagnetic field data to a memory and associate the electromagnetic field data with a user account identifier and store the association to the memory.

Other embodiments are directed toward methods of using the point of issuance cracking device that can include providing the portable consumer device to the cracking device, cracking the brittle material layer using the fissure pattern creation device and detecting the crack pattern in the cracked brittle material layer with the crack pattern detection system. The method can further can include associating the detected crack pattern to a user account identifier and recording the detected crack pattern to a memory and the association with the user account identifier to a memory.

Various other embodiments are directed toward a portable consumer device that can include a substrate layer and a conductive brittle material layer disposed on the substrate layer. The conductive brittle material layer includes intentionally created unique and random cracked patterns and electrical leads to accept an electrical signal to produce a distinctive electromagnetic field (EMF) signature.

A method of using the portable consumer device with a conductive brittle material layer to authenticate a user account includes receiving the portable consumer device in an access device, applying an electrical signal to the electrical leads, detecting the EMF signature and retrieving a user account identifier and a stored EMF signature associated with the user account identifier. The detected EMF signature to the stored EMF signature can be compared and the authenticity of the of the portable consumer device can be determined in response to the comparison of the detected EMF signature to the stored EMF signature. In other embodiments, the portable consumer device with a conductive brittle material layer can be exposed to a magnetic field to induce an electrical signal. The electrical signal can then be detected and compared to a stored electrical signal to authenticate the portable consumer device.

BRIEF DESCRIPTION OF THE DRAWINGS

FIGS. 1A, B and C depict payment cards in the prior art that can be improved by embodiments of the present invention. FIG. 1A shows a front view, while

DETAILED DESCRIPTION

Figure 2A:
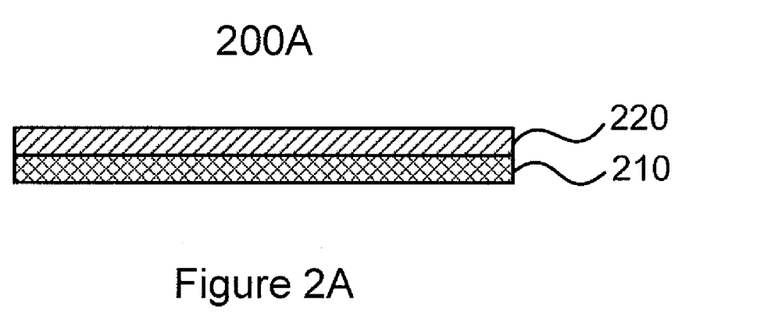
FIGS. 2A, B and C depict side, cross-sectional views of portable consumer devices according embodiments of the present invention.

FIG. 2A depicts the cross section of a portable consumer device according to one embodiment of the present invention. Portable consumer device 200A includes two layers. In various embodiments, layer 210 is a substrate layer and can be made up of any suitable material including, but not limited to, plastic, resin, metal, or some combination or composite thereof. For many embodiments, it is desirable to choose a material for substrate 210 that balances the rigidity of the material with the ability of the material to be stamped or embossed, such as when credit, debit or gift cards are embossed with account numbers, names and other information. Such embossed features can be achieved by custom or standardized stamps, presses, impact printers, molds or otherwise. In various embodiments, it is desirable for the substrate to not puncture or perforate when stamped or embossed.

In some embodiments, layer 220, in contrast to layer 210, is a brittle material that can break, crack, crease or otherwise become discontinuous when subjected to shearing, stress or strain. In various other embodiments, brittle material layer 220 is stable enough that once it is intentionally broken or cracked to create a unique fissure pattern during the manufacturing or issuing process, further cracking and breakage stops or is minimal. In some embodiments, brittle material layer 220 can be heat treated, irradiated, chemically set or otherwise annealed or softened to prevent further breakage after the initial intentional cracking. In some embodiments, brittle material layer 220 is resistant to surface scratches and abrasions.

In various embodiments brittle material layer is opaque to specific bands of the electromagnetic spectrum. For example, in one embodiment, brittle material layer 220 is opaque to ultra violet light. In yet another embodiment, brittle material layer 220 is opaque to infrared light. When brittle material layer 220 is opaque, the fissure pattern can be detected or imaged by back illuminating the portable consumer device 200A and imaging or otherwise detecting the resulting illuminated fissure pattern. In various embodiments of the present invention, substrate layer 210 is at least partially translucent to whatever band or frequency of the electromagnetic spectrum to which brittle material layer 220 is opaque.

Figure 2B:
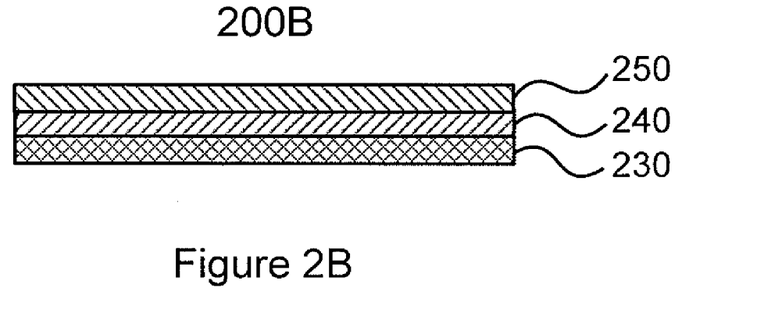

FIG. 2B depicts portable consumer device 200B according to various embodiments of the present invention. Portable consumer device 200B is similar to the portable consumer device 200A in FIG. 2A, except portable consumer device 200B includes three layers; 230, 240 and 250. In various embodiments, layer 230 is a substrate layer similar to layer 210 described above and can be made of material including, but not limited to, plastic, metal, resin, or an appropriate polymer that can be formulated to have the desired balance of rigidity and malleability. In various embodiments, the balance of rigidity and malleability is achieved when layer 230 can withstand stamping, embossing or bending without breaking, splitting or perforating. Layer 240 is a brittle material that can include, but is not limited to, glass, ceramic or doped silicon.

In various embodiments, brittle material layer 240 can be annealed or softened to prevent breakage once a fissure pattern is produced in the portable consumer device 200B. The brittle material layer 240 can be made hard enough or soft enough so that after the intentional cracking it resists or prevents further cracking. In various embodiments, fissures patterns are produced in brittle material layer 240. Brittle material layer 240 is then annealed or softened before protective layer 250 is applied to portable consumer device 200B. In other embodiments, protective layer 250 is applied to portable consumer device 200B and then brittle material layer 240 is annealed. In yet other embodiments, layers 230, 240 and 250 are joined together and then the fissure pattern is created in portable consumer device 200B. Once the fissure pattern is created in the portable consumer device 200B, the entire portable consumer device 200B is treated such that substrate layer becomes more rigid to protect brittle material layer 240, brittle material layer 240 is annealed, and protective layer 250 is fused to brittle material layer 240 and hardened to prevent further breaking or movement of brittle material layer 240.

In various embodiments, protective layer 250 can conceal at least some of the area of the brittle material layer 240 from view. In various other embodiments, protective layer 250 can be at least partially translucent (e.g. transparent). In yet other embodiments, protective layer 250 is translucent in some regions of the portable consumer device 200B and opaque over other regions of the portable consumer device 200B. In such embodiments, it is possible to see the portions of the fissure patterns in the regions where protective layer 250 is translucent, whereas the portions of the fissure pattern under concealed regions of the protective layer 250 are hidden from view. In some embodiments, protective layer 250 can be opaque to visible light but translucent or transparent to other bands or frequencies of the electromagnetic spectrum outside of the human visible spectrum.

Figure 2C:
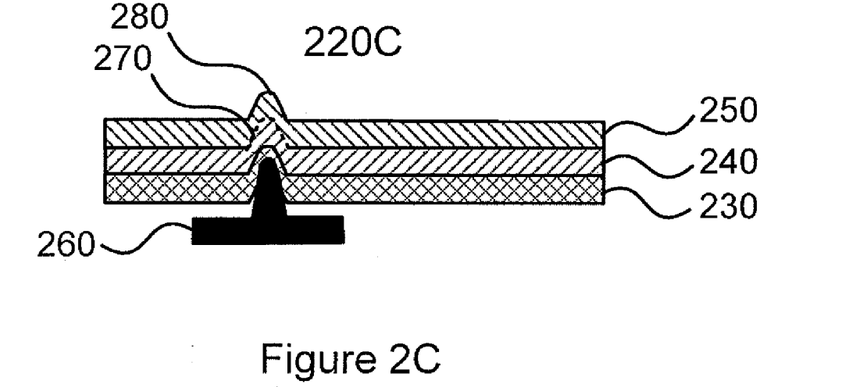

FIG. 2C depicts one method of creating a fissure pattern in the brittle material layer 240 according to various embodiments of the present invention. In various embodiments, protective layer 250, brittle material layer 240 and substrate layer 230 are stacked as shown in portable consumer device 200C. In some embodiments, the process starts with forming and cutting a precursor for the substrate layer 230 into the desired size, shape and thickness. In some embodiments, the substrate layer 230 has the same lateral dimensions as a credit or debit card. In various embodiments, the substrate layer 230 is approximately 0.5 mm to 2 mm thick. In such embodiments, the overall thickness of the portable consumer device, including the substrate layer 230, the brittle material layer 240 and the protective layer 250 should be in the range between 0.6 mm to 2.5 mm.

In various embodiments, brittle material layer 240 is applied to the substrate layer 230. Application of the brittle material layer 240 to substrate layer 230 can be achieved in numerous ways. In one embodiment, brittle material layer 240 is a sheet of material that can be adhered to the surface of substrate layer 230 (e.g. in a lamination processes). In various embodiments, brittle material layer 240 is applied as a paint, liquid, gel or slurry. In such embodiments, the brittle material layer can be brushed, rolled or sprayed onto the surface of substrate layer 230. In various embodiments, the paint, liquid, gel or slurry for the brittle material is dried, treated or otherwise hardened before proceeding to the next step. In various embodiments, the drying of brittle material layer 240 causes fissure patterns in brittle material layer 240. For example, a paint or a slurry of a solvent and a pigment can be formulated to result in an unpredictable cracked pattern similar to that observed in quickly dried mud or paint or crazed glass. Those skilled in the art will recognize that there are various methods that can be used to create unpredictable and random fissure patterns in the brittle material layer without departing from the spirit or scope of the present invention.

In various embodiments, protective layer 250 is applied to the exposed surface of brittle material layer 240. In some embodiments, protective layer 250 is a film and is applied in sheet form. In various other embodiments, protective layer 250 is applied as a paint, liquid, gel or a slurry. In various embodiments, at least a portion of the protective layer 250 is opaque to visible light. In other embodiments, protective layer 250 is transparent to visible light over all or some of the area of the portable consumer device 200C. In this way, the surface of brittle material layer 240 can be selectively exposed. In various embodiments it is desirable to obscure some or all of the fissure pattern to further thwart potential fraud or counterfeiting.

As mentioned previously, in some embodiments the brittle material layer 240 can be opaque to various forms of radiation. For example, brittle material layer can be opaque to bands of the electromagnetic spectrum in or out of the human visible range. In such embodiments, it is beneficial for the substrate layer 230, the protective layer 250 or both to be more transparent to the particular form of radiation to which the brittle material layer 240 is at least partially opaque. In various embodiments, brittle material layer 240 will polarize or reject based on polarization at least a portion of the radiation incident on portable consumer device 200B. In various embodiments, it is possible to detect the fissure patterns in brittle material layer 240 by illuminating the portable consumer device with a particular form of radiation and detecting the shadows, interference patterns, diffraction patterns, polarization effects or refraction patterns of the fissure pattern in brittle material layer 240. For example, the brittle material layer 240 can be opaque to x-rays while the protective layer 250 and the substrate layer 230 are transparent to x-rays. In this way, an x-ray image of the fissure pattern can be produced with an x-ray emitter and an x-ray detector. Such a process is described in more detail in reference to FIG. 6.

In various embodiments of the present invention, the fissure pattern is created by a stamp or embosser 260. In various embodiments, the embosser is the same one used to emboss information into the portable consumer device 200C. In various embodiments, when stamp 260 strikes or presses into the substrate layer, it pushes up and deforms substrate layer 230, which in turns cracks or breaks brittle material layer 240 and presses the cracked portion of brittle material layer 240 up and into protective layer 250. The result is an embossed figure, letter, number or symbol. In some embodiments, the fissure patterns 270 are detected or imaged on and around the regions 280 that are embossed.

Figure 3:
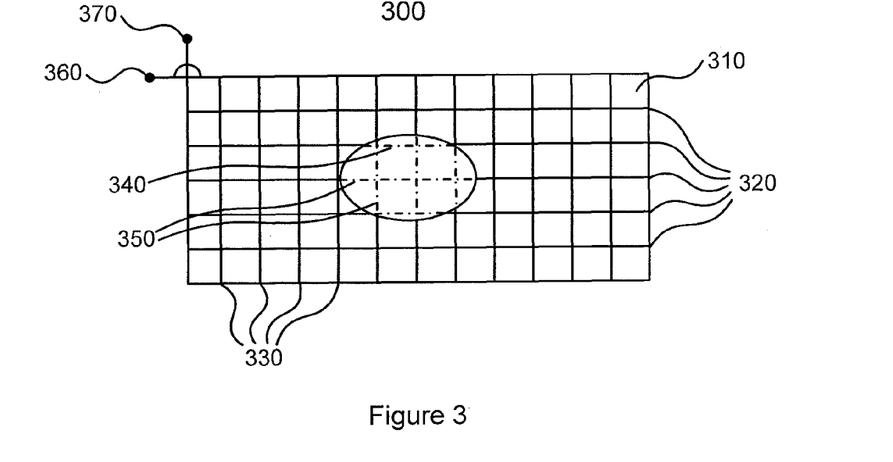
FIG. 3 shows a top view of a layer of conductors according to an embodiment of the present invention.

FIG. 3 is an overview of a sample region 300 of brittle material layer 240 according to yet another embodiment of the present invention. Sample region 300 is lined with conductors 320 and 330 in a grid pattern. In other embodiments, conductors 320 and 330 can be in some other multi-celled configuration such as a hexagonal grid or triangular grid. In some embodiments, conductors 320 and 330 are electrically coupled. In other embodiments, conductors 320 and 330 are electrically isolated from each other. In various embodiments, the conductors are sandwiched between a substrate layer and protective layer. In various embodiments, conductors 320 and 330 are semiconductors such as doped silicon.

In various other embodiments, the conductors in one direction, such as conductors 320 are couple to a bus 390 that has a lead 370 so that an electrical signal can be applied to conductors 320. Similarly, in various embodiments, conductors 330 are coupled to bus 380 that has a lead 360 so that an electrical signal can be applied to conductors 330. In those embodiments in which conductors 320 are electrically isolated from conductors 330, a separate signal can be applied to lead 360 and lead 370. In some embodiments, the signal applied to lead 320 is different from the signal applied to lead 330.

In various embodiments, lines 350 are cracked or broken when feature 340 is embossed into sample region 300. The dimple in FIG. 3 is just an example of one type of feature 340 that can be embossed into portable consumer device 300. In various other embodiments, sample region 300 can be embossed with any information desired such as account numbers, identification information or names. Each embossed feature can create a unique fissure or breakage pattern in conductors 320 and 330 at points 350. The fissure or breakage patterns at points 350 in embossed feature 340 can be detected by appropriate means.

In various embodiments, the fissure or breakage patterns at points 350 in feature 340 can be imaged using conventional visible light imaging. In various other embodiments, fissure or breakage patterns at points 350 in feature 340 can be detected using conventional non-visible radiation imaging. For example, x-ray, ultraviolet, infrared or sound imaging can be used to detect and record fissure or breakage patterns at points 350 in feature 340. One skilled in the art will recognize that other methods of detecting fissure or breakage patterns at points 350 in feature 340 are possible without deviating from the spirit or scope of the present invention.

In various other embodiments, a signature of the electromagnetic field (EMF) can be detected to recognize the fissure or breakage patterns at points 350 in feature 340. By applying an electrical signal to leads 360, 370 or both, the array of conductors 320 and 330 will have a distinctive EMF signature that can be detected. In various other embodiments, conductors 320 and 330 are electrically coupled and the sample region can be inserted into a calibrated alternating or varied magnetic field to induce a current in each of the remaining closed loops. In such an embodiment, the current or the induced opposing magnetic field can be measured to detect the signature of the portable consumer device.

Figure 4:
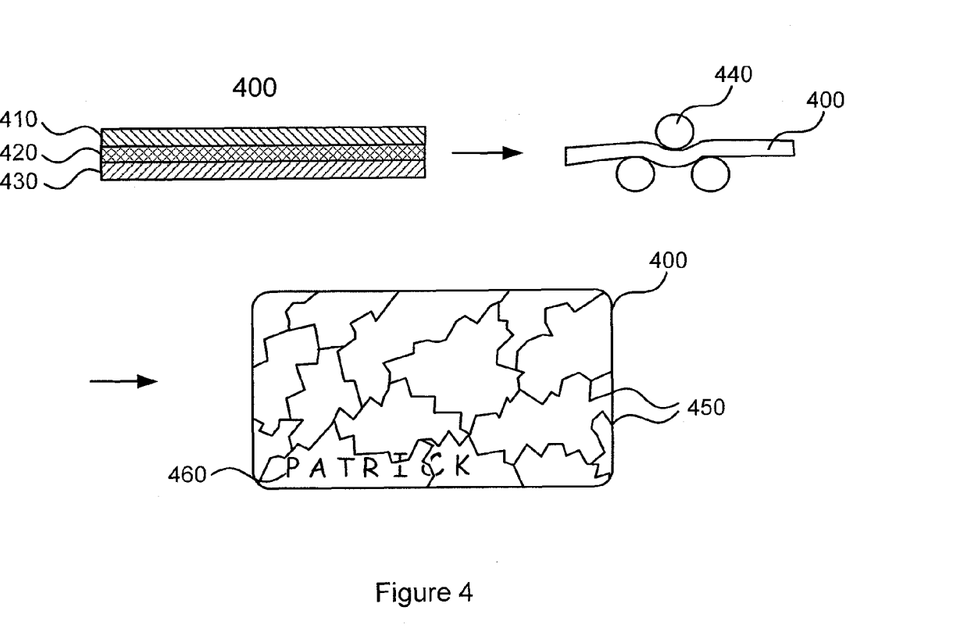
FIG. 4 depicts the process and result of creating fissure patterns in a portable consumer device according to an embodiment of the present invention.

FIG. 4 is an illustration of a method to create fissure patterns in brittle material layer 420 of portable consumer device 400 according to one embodiment of the present invention. In various embodiments, portable consumer device 400 includes a substrate layer 430, a brittle material layer 420 and a protective layer 410. Portable consumer device 400 is passed through a set of rollers 440 configured to deform portable consumer device 400 to the point where brittle material layer 420 develops fissures or cracks 450. As depicted in FIG. 4, rollers 440 with offset radii are arranged so that portable consumer device 400 is deformed in a serpentine fashion as it is passed through the rollers to create fissures and cracks in brittle material layer 420. In other embodiments, fissure and cracks can be created by physical, thermal or sonic shock to the surface of portable consumer device 400.

In some embodiments, portable consumer device 400 is struck with a blunt or sharp hammer one or more times to create fissure patterns in the brittle material layer 420. In various other embodiments, the location, direction, amount of force of the blow, and hardness and shape of the hammer is varied from portable consumer device to portable consumer device to further increase the variety and style of fissure patterns created in the brittle material layer 420 of each portable consumer device manufactured.

In various embodiments, the same standardized process to create fissure patterns in the brittle material layer can be used to create a plurality of portable consumer devices each with a unique fissure pattern different from the fissure pattern in any other portable consumer device produced by the standardized process. In such embodiments, the process can include a single device, or many identical devices, that subject a plurality of portable consumer devices to the same stress, strain or shock and because of the material properties of the brittle material, a fissure pattern unique to each portable consumer device will be created. The standardized process can comprise, but is not limited to, a set of rollers to deform the portable consumer device, a set of hammers or stamps with which to strike the portable consumer devices, a spring loaded sudden stop or other means for applying a physical shock to the portable consumer devices. In various other embodiments, the standardized process can comprise a predetermined thermal shock or sonic shock. Ideally, the nature of the material used for brittle material layer will crack, shatter or craze in unpredictable ways so that each portable consumer device produced will have a unique and irreproducible fissure pattern. One example of the desired type of fissure pattern is the unpredictable cracked, shattered or crazed patterns seen in broken or shattered sheets of glass, porcelain or ceramic. Thus, embodiments of the invention can economically use the same process to create portable consumer devices including different fissure patterns that can be used to authenticate them when they are used to conduct transactions.

In some embodiments, the material used has non-crystalline or anisotropic internal structure. In other embodiments, the material used in brittle material layer 420 has crystalline or isotropic internal structure. A person of ordinary skill in the art will recognize that many types of materials can be used to make brittle material layer 420 without departing from the spirit or scope of the present invention.

In various embodiments, information can be printed on brittle material layer 420 before cracks and fissures 450 are created. For example, account numbers, names and other identification information 460 can be printed on the surface of brittle material layer 420 before it is coated with protective layer 410. In such embodiments, figures and text printed on brittle material layer will break in unique ways as shown in FIG. 4 at name 460. As shown, the name "PATRICK" is broken along the "I" and the "C" at locations where the letters intersect cracks or fissures. Information regarding the location and manner in which text or figures are broken can be used, in addition to or as part of the fissure or crack pattern data, to authenticate the portable consumer device 400.

In various embodiments, rollers 440 include three rollers where one roller is opposite the two other rollers such that portable consumer 400 device deforms in at least one direction. In various other embodiments, more than three rollers can be configured to deform portable consumer device 400 in two directions and potentially more than once by running portable consumer device 400 through rollers 440 more than once or in more than one direction. For example, portable consumer device 400 can be run through roller 440 in one direction such as along the long axis of the portable consumer device 400 and then be run through the rollers in the reverse direction. Optionally, portable consumer device 400 can then be reoriented by rotating portable consumer device 400 90° around an axis perpendicular to the surface of the portable consumer device 400 and passed through rollers 440 again. One skilled in the art will recognize that the use of rollers to deform portable consumer device 400 can include many variations of orientations, number of rollers and number of passes without deviating from the spirit or scope of the present invention.

In various embodiments, fissure patterns are created at the point of sale or issuance of each portable consumer device. Such embodiments are particularly useful to prevent fraud in consumer prepaid payment or gift cards. For example, a portable consumer device can be a prepaid gift card. In such embodiments, the fissure patterns can be produced in the brittle material layer in a compact cracking device at the point of sale. For example, the gift card can be deformed to create the fissures in a cracking device located near a cash register or in a kiosk.

In various embodiments of the present invention, the compact cracking device includes rollers. In various other embodiments, the compact cracking device includes a hammer surface against which or with which to strike or shock the gift card to produce fissure patterns in the brittle material layer 420. In various other embodiments, the compact cracking device includes a fissure pattern detection system that can detect and record the unique fissure pattern data of each individual portable consumer device for use later in authenticating that particular portable consumer device when a user tries to redeem it. A fissure pattern detection system is described in more detail below in reference to FIG. 6.

Figure 5A:
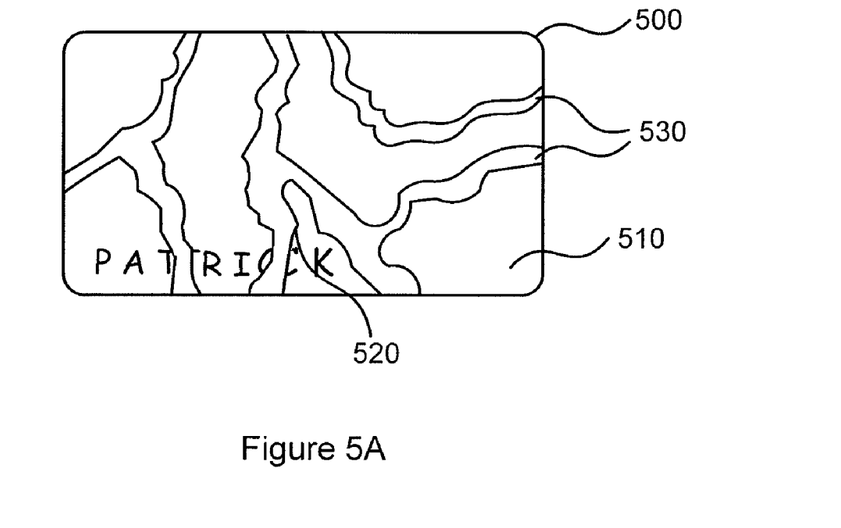
FIG. 5A depicts a fissure pattern on a portable consumer device according to an embodiment of the present invention.

FIG. 5A is an illustration of a portable consumer device that uses a slurry comprising one or more solvents and one or more pigments to produce the fissure pattern in portable consumer device 500 according to one embodiment of the present invention. Portable consumer device 500 includes four layers; substrate layer 570, barrier layer 560, brittle material layer 550 and protective layer 540. In other embodiments, portable consumer device 500 can include more or fewer layers. The scale of the layers relative to one another in FIG. 5, or in any of the other figures discussed herein, should not be considered limiting in any way. One skilled in the art will recognize that various thicknesses of each layer can be used without deviating from the spirit and scope of the present invention.

In one embodiment of the present invention, substrate layer 570 and barrier layer 560 are adhered or otherwise attached to one another. In various embodiments, barrier layer 560 and substrate layer 570 can be the same layer of portable consumer device 500. In some embodiments, barrier layer 560 prevents solvents from penetrating or being absorbed by substrate layer 570. In various embodiments of the present invention, brittle material layer 550 is applied to all or some of the surface of barrier layer 560 in the form of a slurry. In various embodiments, the slurry can be used as a paint to print text, a pattern or a picture such a company name or a logo. In various other embodiments, the slurry is applied to the entire surface of barrier layer 560. The slurry can include an admixture of one or more solvents and one or more pigments. In some embodiments, the evaporation rate or concentration of each solvent used in the slurry can be different so that one solvent evaporates before the others.

In various embodiments, as the slurry dries, the top of the brittle material layer 550, because it is exposed, dries at a faster rate than the bottom of brittle material layer 550. As the solvents evaporate, the slurry dries. As the slurry dries it contracts. Because of the different rates of drying based on depth of the slurry and the types of solvents used, fissures 530 will form at the top of the slurry because the top will contract at a rate faster than the slurry closer to the barrier layer 560. In various embodiments, once the slurry is entirely dry and brittle material layer 550 includes sufficient fissure patterns 530 for use in authenticating the portable consumer device 500, brittle material layer can be treated so that more fissures do not develop after the time of manufacture.

In various embodiments, treating brittle material layer 550 can include applying plasticizers to the brittle material layer 550 to make it supple or flexible. In various other embodiments, treating brittle material layer 550 can include heating, irradiating or cooling the portable consumer device 500 to make brittle material layer softer. In various other embodiments, protective layer 540 is applied to and fused to brittle material layer to immobilize and stabilize the fissure pattern 530.

In various embodiments, brittle material layer 550 is one color and using another color, text or other figures can be printed on the surface of brittle material layer 550 while the top of the slurry is still wet. In such embodiments, the printed text or figures will crack where the top surface of the brittle material layer 550 cracks making unique cuts and breaks into the printed text or figures that can also be used for later authentication when a user presents the portable consumer device 500 to an authentication requestor.

Figure 5B:
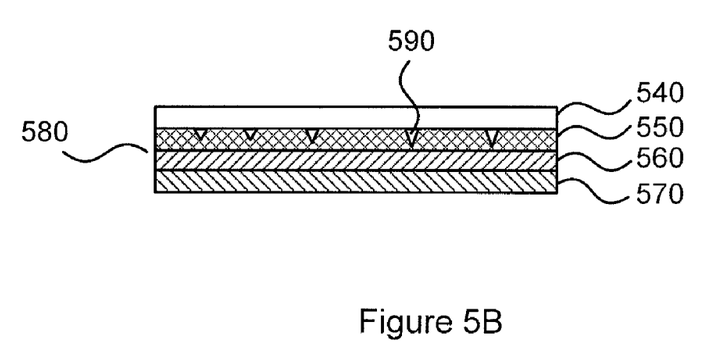
FIG. 5B depicts the cross-sectional view of a fissure pattern in a portable consumer device according to an embodiment of the present invention.

In yet other embodiments, fissure patterns 450 and 590 can be observed or detected at the edge 580 of portable table consumer device 500. In such embodiments, the edge 580 of portable consumer device 500 is presented to a sensor. Details of such a method and apparatus are discussed below in reference to FIG. 7.

Figure 6:
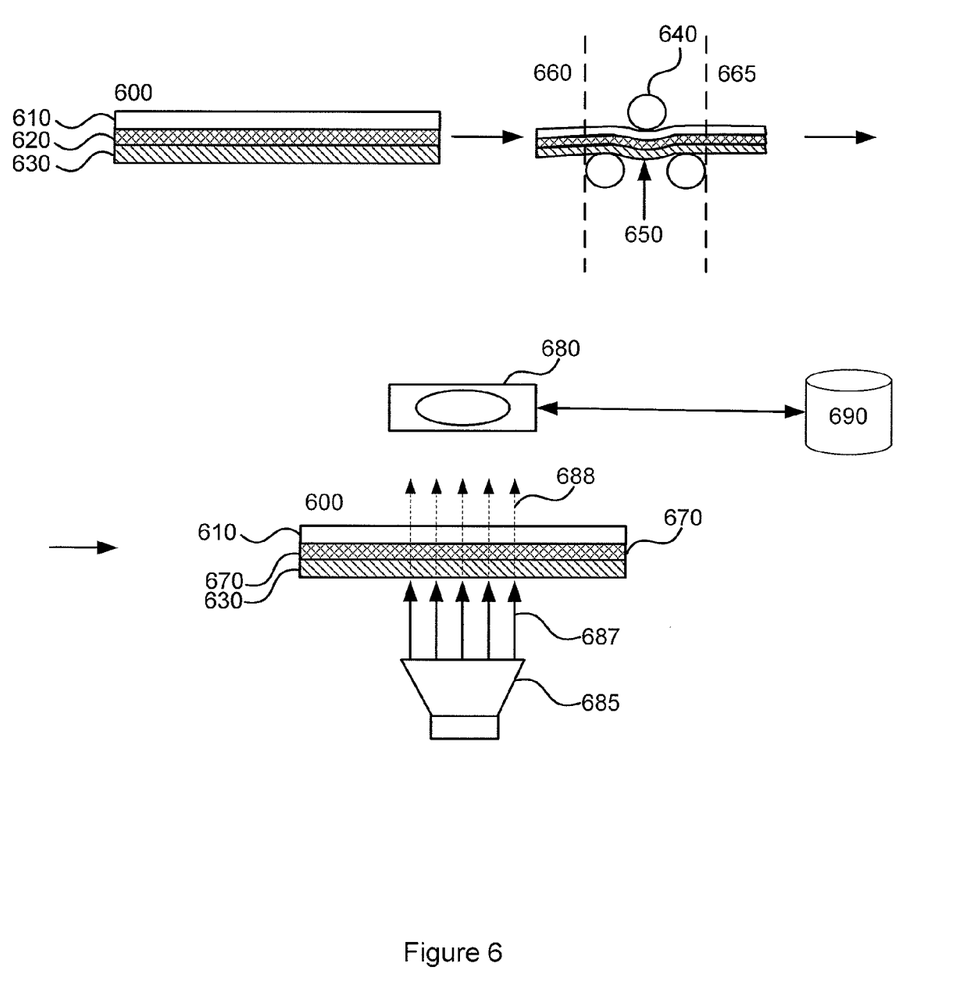
FIG. 6 depicts a system which can be used to perform a method for creating and detecting fissure patterns in a portable consumer device according an embodiment of the present invention.

FIG. 6 is a fissure pattern producing and detection system according to one embodiment of the present invention. A portable consumer device 600 with at least a substrate layer 630, a brittle material layer 620 and protective layer 610 passes through a set of rollers 640 thus deforming portable consumer device at point 650. The deformation of portable consumer device 600 at point 650 is severe enough such that the fissure pattern in brittle material layer 620 in region 665 after the rollers is significantly different from fissure patterns that might have been present in the brittle material layer 620 in the region 660 before the rollers. Once portable consumer device 600 is processed to have a unique fissure pattern, data regarding the unique fissure patterns is detected and recorded by sensor 680. In various embodiments, source 685 directs radiation 687 at the substrate layer 630 side of portable consumer device 600 to back-expose it. Depending on whether the brittle material layer 670 is completely opaque or partially translucent to radiation 687, radiation 687 is either completely blocked or attenuated in the regions where the brittle material layer is intact. In regions where brittle material layer 670 is cracked, radiation 687 passes through portable consumer device 600 and emerges on the other side as attenuated radiation 688. In various embodiments, radiation 687 can be a form of radiation including, but not limited to, visible light, infrared light, ultraviolet light, polarized radiation, x-rays, sonic waves or sonic pulses. Attenuated radiation 688 can then be imaged or detected by sensor 680. In various embodiments, sensor 680 includes appropriate filters, receivers, polarizers or lenses to better detect attenuated radiation 688. In various embodiments, attenuated radiation 688 can be detected as a transmittance profile. In other embodiments, the attenuated radiation 688 can be measured as an integrated total transmittance value using an optical integrating device such as an integrating sphere.

In various embodiments, the fissure pattern in portable consumer device 600 is detected or imaged all at once in a single exposure like a photograph. In such embodiments, sensor 680 can be an imaging device such as a digital camera. In other embodiments, portable consumer device 600 is moved relative to sensor 680 and source 685 to scan the fissure pattern. In such embodiments, sensor 680 can be a scan-head in close proximity to surface of portable consumer device 600.

In various other embodiments, brittle material layer 620 includes material that can be excited by incident radiation so as to reemit radiation. For example, brittle material layer can contain phosphors or fluorescent materials that are temporarily excited into higher energy states by electrons or ultraviolet light so that they appear to glow in all regions except where the brittle material is cracked. The resulting image of the fissure pattern looks like a dark pattern of cracks on a bright background. In such embodiments, source 685 can be mounted so that radiation 687 is incident on the portable consumer device 600 from the same side on which sensor 680 is located.

The image of fissure or other fissure data detected regarding the fissure pattern in the brittle material layer 670 can be stored in memory 690 (which may be a database). In various embodiments, fissure data can comprise data and information regarding the unique fissure pattern in the brittle material layer 670 including, but not limited to, an image of at least a portion of the fissure pattern, an EMF signature of the fissure pattern, or a transmittance profile of at least a region of the portable consumer device. Memory 690 can be local relative to sensor 680 and source 685 or it can be located at a remote location connected via a network. In yet other embodiments, the system in FIG. 6 does not include the capability to deform portable consumer device 600 such as rollers 640. In such embodiments, the system in FIG. 6 is a fissure pattern detection system that can be used to image or detect the fissure patterns in the brittle material layer 670 when a consumer presents the portable consumer device 600 to an authentication requestor for authentication. For example, a fissure pattern detection system can be included in an access device like a point-of-sale terminal.

Figure 7:
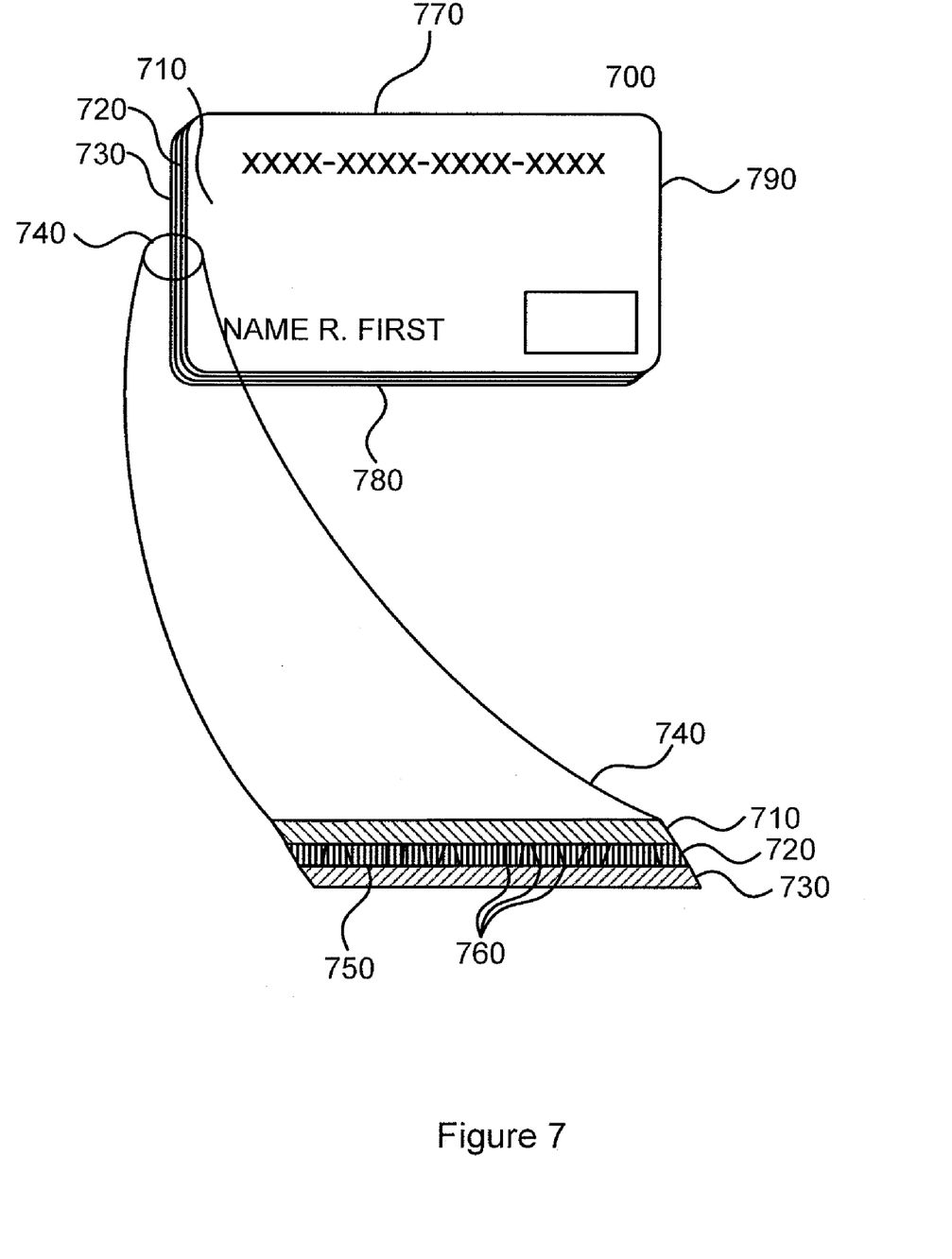
FIG. 7 depicts the side view of edge features of a fissure pattern in a portable consumer device according to an embodiment of the present invention.

FIG. 7 depicts a portable consumer device in the form of a card 700 with detectable edge characteristics due to the fissure pattern in the brittle material layer 720. Card 700 has a brittle material layer 720 with a unique fissure pattern sandwiched between a protective layer 710 and substrate layer 730. A blow-up of edge 740 is shown. Regions of the brittle material layer 720 edge that have no cracks appear to be solid regions 750 of brittle material layer 720. The fissure pattern appears at edges 740, 770, 780 and 790 as cracks or voids 760 in the brittle material layer 720. In various embodiments, the pattern of voids 760 to solid regions 750 can be a distinguishable as the fissure pattern on which they are based. In various embodiments, the voids 760 and solid regions 750 pattern of at least one edge of card 700 is scanned each time the card is presented by a user.

Figure 8:
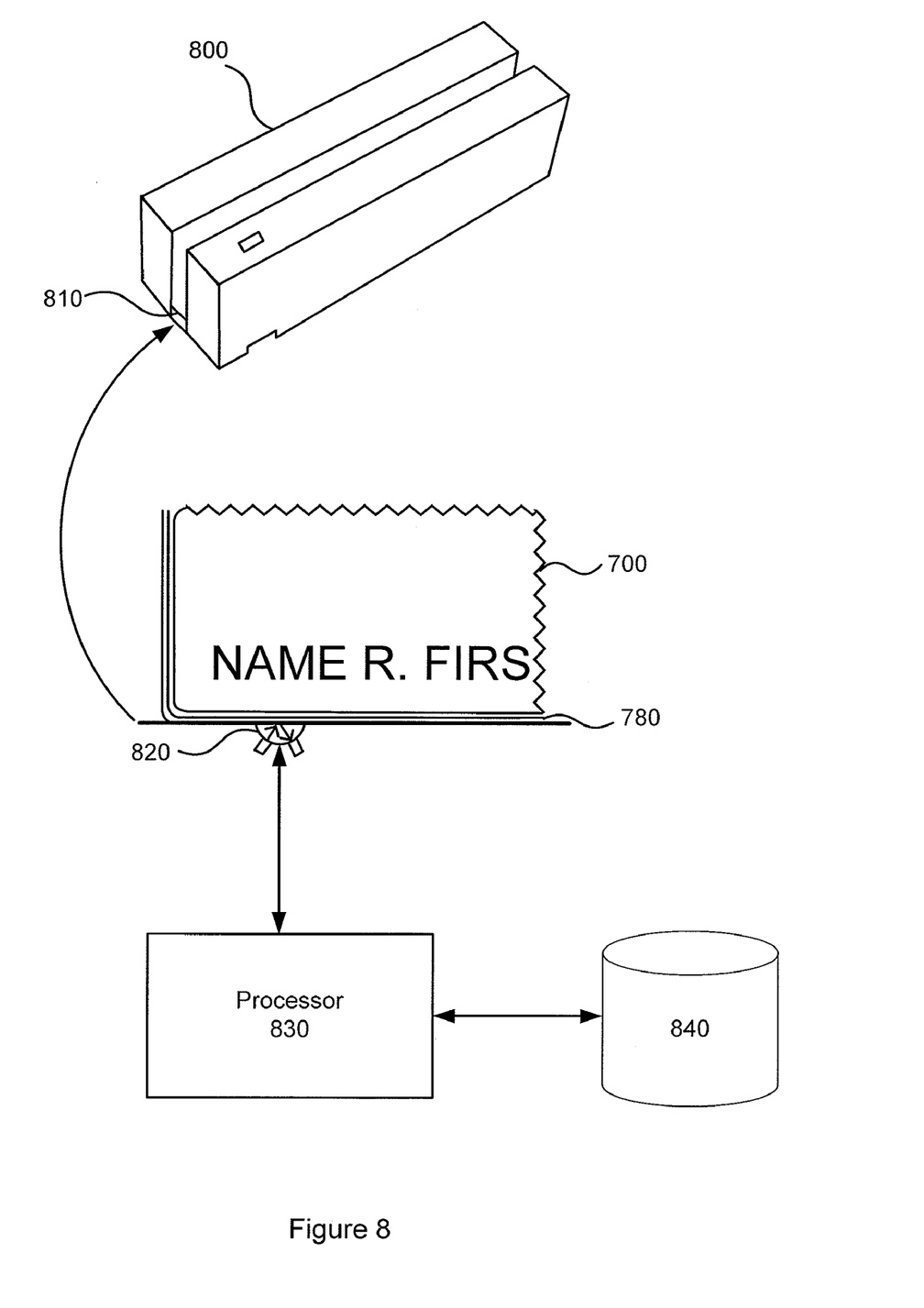
FIG. 8 depicts an apparatus for detecting edge features of a fissure pattern in a portable consumer device according to an embodiment of the present invention.

FIG. 8 depicts a card reader 810 with an edge feature detection sensor 820 according to one embodiment of the present invention. In one embodiment, edge feature detection sensor 820 is in the bottom of slot 810 of a card reader 800. When card 700 is passed through card reader 800, edge feature detection sensor 820 detects the edge features including, but not limited to, solid regions 750 and voids 760. In various embodiments, edge feature detection sensor 820 measures the speed at which the card is swiped through card reader 800. In various embodiments, edge feature detection sensor 820 is connected to processor 830. Processor 830 processes the signal coming from edge feature detection sensor 820 into edge feature data and then compares it with the edge feature data associated with card 700 stored in data store 840. If the edge feature data detected from card 700 matches the edge feature data associated with card 700 in data store 840, then card 700 can be authenticated.

Figure 9:
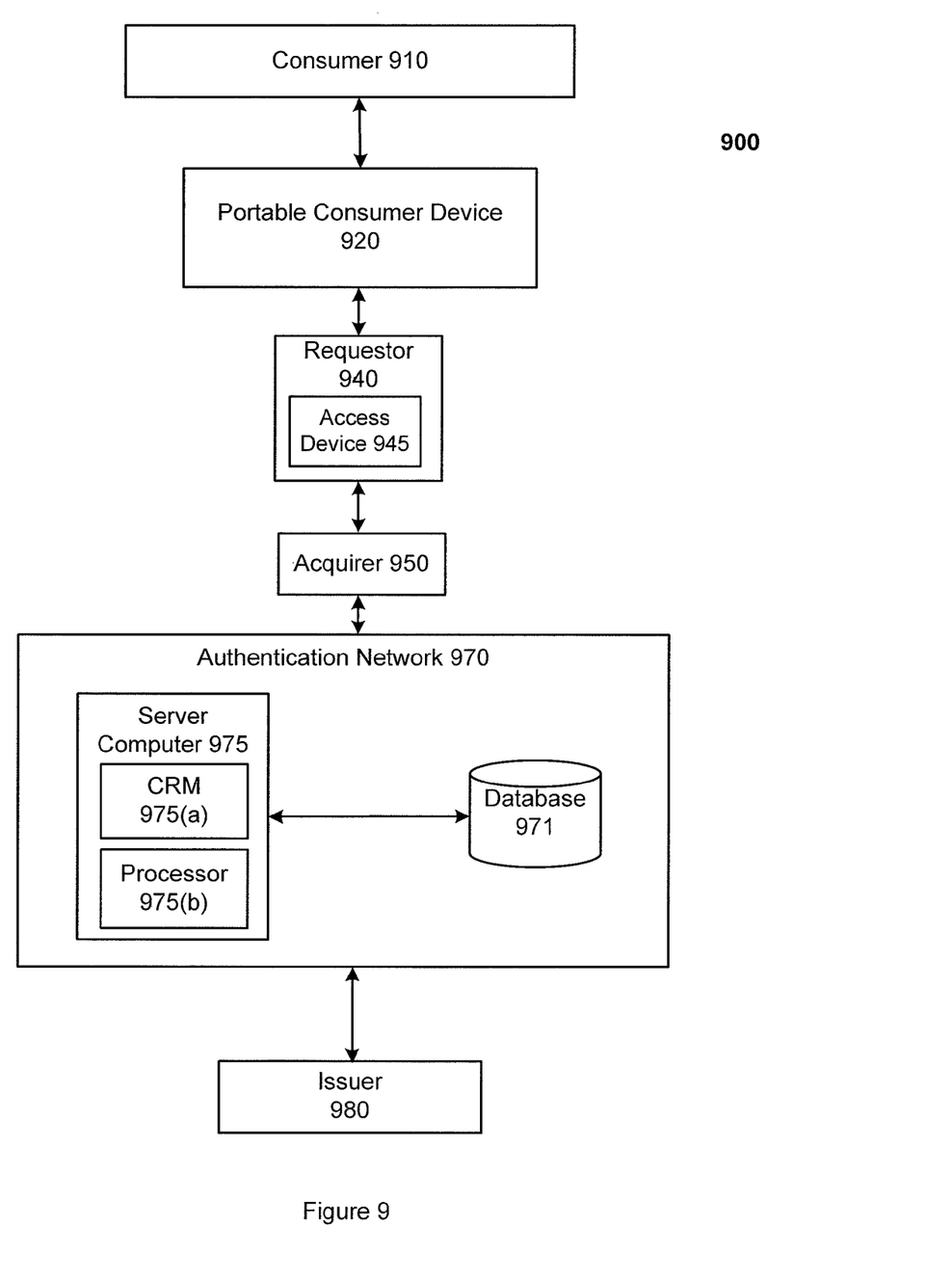
FIG. 9 is a block diagram of a system for authenticating a consumer using a portable consumer device with a fissure pattern according to an embodiment of the present invention.

FIG. 9 is a block diagram of an exemplary system 900 according to an embodiment of the invention. Although FIG. 9 shows a number of components, the system 900 according to embodiments of the invention may comprise any suitable combination or subset of such components.

The system 900 includes a consumer 910 that uses a portable consumer device 920 (e.g. a smart card or magnetic credit card) having a unique fissure pattern (not shown in FIG. 9). Specific examples of portable consumer devices are provided below.

The system 900 also includes a requestor 940 associated with an access device 945 (e.g., a point-of-sale terminal or card reader). The portable consumer device 920 can communicate with the access device 945 when an authentication is conducted. The access device 945 can be configured to detect the unique fissure pattern associated with the portable consumer device 920. The system 900 also includes an acquirer 950 (e.g., a bank or security company) associated with the requestor 940.

The system 900 also includes an authentication processing network 970 having a server computer 975 in communication with a database 971. The system 900 also includes an issuer 980 that maintains an account associated with the consumer 910 and the portable consumer device 920. Some examples of issuers may be a bank, a business entity such as a retail store, a security company or a governmental entity.

The requestor 940 can be any suitable type of entity. Some examples of requestors include a department store, a gas station, a drug store, a grocery store, a building management company, a university, etc. In practice, a request can be any entity that would like to authenticate a portable consumer device for various purposes. Some examples of contemplated purposes include payment authorization, building access or security screening, etc.

The access device 945 can be any suitable device capable of communicating with the portable consumer device 920. Examples of suitable devices include point-of-sale (POS) terminals, mobile phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, websites, and the like. Access device 945 may use any suitable contact or contactless mode of operation to communicate data to and from portable consumer device 920. In addition, access device 945 may use any suitable mode of operation to detect the fissure pattern contained in portable consumer device 920.

The payment authentication processing network 970 may include data processing subsystems, networks, and operations used to support and deliver authorization services, exception file services, and clearing and settlement services. An exemplary authentication processing network 970 may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization request messages and a Base II system which performs clearing and settlement services.

In FIG. 9, the authentication processing network 970 includes a server computer 975 which is an example of a back end computer. Although FIG. 9 shows the server computer 975 residing in the payment processing network 970, it may alternatively reside at the issuer 980 in other embodiments of the invention.

A "server computer" can refer to a computer or cluster of computers. For example, the server computer 975 can be a large mainframe, a minicomputer cluster, or a group of servers functioning as a unit. In one example, the server computer 975 may be a database server coupled to a Web server (not shown). The authentication processing network 970 may use any suitable wired or wireless network, including the Internet.

As shown in FIG. 9, the server computer 975 has a CRM 975(a) in communication with a processor 975(b). The CRM 975(a) comprises code for performing the functions of server computer 975, while the processor 975(b) executes the code to perform the functions of server computer 975. Some examples of code stored in the CRM 975(a) include code for analyzing and comparing fissure pattern data from access device 945, code for receiving user input data from the consumer 910, code for retrieving fissure pattern data from database 971, etc. The code stored on the CRM 975(a) could also be stored on a computer readable medium residing in the portable consumer device 920, the access device 945 or a computer at the issuer 980, as any of these devices may be used to receive fissure pattern data from access device and database 971.

The authentication processing network 970 also includes a database 971 in communication with the server computer 975. The fissure pattern data from when a portable consumer device is created or activated can be temporarily or permanently stored in the database 971.

One embodiment of the present invention comprises a method for using the portable consumer device 920 with a unique fissure pattern to obtain authorization for a particular transaction. According to one embodiment of the present invention, the consumer 910 presents the portable consumer device 920 to the requestor 940. The particular transaction can comprise many different types of transactions and the few discussed herein and should be considered exemplary and should in no way be viewed as limiting the present invention.

In various embodiments, the transaction that consumer 910 may want to engage in is a purchase for which he or she seeks authorization to make a payment for the purchase with a consumer payment account (e.g. credit or debit account) associated with the portable consumer device 920. In various other embodiments, the consumer 910 may want access to a controlled access area, such as a secure building or room, and is seeking authorization to enter based on the clearance or permission credentials associated with the portable consumer device 920. In various embodiments, the portable consumer device 920 is an access card that can be carried in the consumers 910's pocket or wallet or on a lanyard.

In some embodiments, presenting the portable consumer device 920 comprises inserting into or otherwise positioning the portable consumer device 920 on the access device 945 of the requestor 940 so the portable consumer device 920 can communicate with or the fissure pattern can be detected by the access device 945. The access device 945 may comprise components of the fissure detection system shown in FIG. 6.

After the access device 945 receives fissure data and sends it to the to the acquirer 950, and then to the authentication network 970. The fissure data may be embedded in an authorization request message requesting authorization for the transaction. In other embodiments, the access device 945 sends the fissure data and/or the authorization request message directly to authentication network 970.

After the authentication network 970 receives the fissure data, the server computer 975(a) determines if the portable consumer device 920 is authentic, by comparing the received fissure data with previously stored fissure data in the database 971. If the portable consumer device is considered to be authentic or is not considered to be authentic, then the server computer 975 (including the computer readable medium 975(a) and the processor 975(b)), can send this information to the issuer 980 so that the issuer 980 can determine whether to approve or deny the transaction. The computer readable medium 975(a) may comprise code for receiving a first set of data regarding the unique fissure pattern associated with the portable consumer device, code for comparing the first set of data regarding the unique fissure pattern associated with the portable consumer device with a second set of data regarding the unique fissure pattern associated with the portable consumer device stored in a database, and code for sending an authorization response message based on whether the first set of data regarding the unique fissure pattern associated with the portable consumer device matches the second set of data regarding the unique fissure pattern associated with the portable consumer device stored the database.

The issuer 980 can receive the authorization request message and can determine if the transaction should be approved or denied. After it makes this decision, it can send an authorization response message back to the access device 945 via the server computer 975 in the authentication network 970 informing the requestor 940 and the consumer 910 as to whether or not the transaction is approved.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A point of issuance cracking device for processing a portable consumer device comprising:
   a fissure pattern creation device for cracking a brittle material layer of the portable consumer device; and a crack pattern detection system configured to detect crack patterns in the brittle material layer of the portable consumer device.

2. The point of issuance cracking device of claim 1 wherein the crack pattern detection system emits or detects at least one of the group consisting of visible light, infrared light, ultraviolet light, polarized radiation, x-rays, sonic waves or pulses.

3. The point of issuance cracking device of claim 1 wherein the fissure pattern creation device for cracking the brittle material layer comprises a set of rollers with offset radii arranged to deform the portable consumer device as it passes through the rollers to create the cracked pattern in the brittle material layer.

4. The point of issuance cracking device of claim 3 wherein the crack pattern detection system comprises:
a radiation source disposed to emit radiation onto a first side of the portable consumer device on a first side of the portable consumer device; and
a radiation sensor disposed to detect the radiation after it is incident on the cracked brittle material layer of the portable consumer device at a second side of the portable consumer device,
wherein the sensor is configured to detect the transmittance of the radiation through the cracked brittle material layer of the portable consumer device.

5. The point of issuance cracking device of claim 3 wherein the crack pattern detection system comprises:
a radiation source disposed to emit radiation onto a first side of the portable consumer device; and
a radiation sensor disposed to detect the radiation after it is incident on the cracked brittle material layer of the portable consumer device on the first side of the portable consumer device,
wherein the sensor is configured to detect the reflectance of the radiation from the brittle material layer of the portable consumer device.

6. The point of issuance cracking device of claim 3 wherein the crack pattern detection system is configured to record crack pattern data to a memory.

7. The point of issuance cracking device of claim 6 wherein the crack pattern detection system is further configured to associate the recorded crack pattern data with a user account identifier and store the association in the memory.

8. The point of issuance cracking device of claim 1 wherein the fissure pattern creation device for cracking the brittle material layer comprises a hammer or a stamp disposed to strike the portable consumer device to crack the brittle material layer.

9. The point of issuance cracking device of claim 8 wherein the crack pattern detection system comprises:
a radiation source disposed to emit radiation onto a first side of the portable consumer device; and
a radiation sensor disposed to detect the radiation after it is incident on the cracked brittle material layer of the portable consumer device on a second side of the portable consumer device,
wherein the sensor is configured to detect the transmittance of the radiation through the portable consumer device.

10. The point of issuance cracking device of claim 8 wherein the crack pattern detection system comprises:
a radiation source disposed to emit radiation onto a first side of the portable consumer device; and
a radiation sensor disposed to detect the radiation after it is incident on the cracked brittle material layer of the portable consumer device on the first side of the portable consumer device,
wherein the sensor is configured to detect the reflectance of the radiation from the brittle material layer of the portable consumer device.

11. The point of issuance cracking device of claim 8 wherein the crack pattern detection system is configured to record crack pattern data to a memory.

12. The point of issuance cracking device of claim 11 wherein the crack pattern detection system is further configured to associate the recorded crack pattern data with a user account identifier and store the association in the memory.

13. The point of issuance cracking device of claim 1 wherein the crack pattern detection system comprises:
electrical leads for applying an electrical signal to the brittle material layer of the portable consumer device to produce an electromagnetic field; and
a sensor for detecting the electromagnetic field.

14. The point of issuance cracking device of claim 13 wherein the crack pattern detection system is configured to record electromagnetic field data to a memory.

15. The point of issuance cracking device of claim 14 further configured to associate the electromagnetic field data with a user account identifier and store the association to the memory.

16. A method of using the point of issuance cracking device of claim 1 comprising:
providing the portable consumer device to the cracking device;
cracking the brittle material layer using the physical shock;
detecting the crack pattern in the cracked brittle material layer with the crack pattern detection system;
associating the detected crack pattern to a user account identifier; and
recording the detected crack pattern to a memory and the association with the user account identifier to a memory.

17. A portable consumer device comprising:
a substrate layer; and
a conductive brittle material layer disposed on the substrate layer,
wherein the conductive brittle material layer comprises intentionally created unique and random cracked patterns and electrical leads to accept an electrical signal to produce a distinctive electromagnetic field (EMF) signature.

18. A method of using the portable consumer device of claim 17 to authenticate a user account comprising:
receiving the portable consumer device in an access device;
applying an electrical signal to the electrical leads;
detecting the EMF signature;
retrieving a user account identifier and a stored EMF signature associated with the user account identifier;
comparing the detected EMF signature to the stored EMF signature; and
determining the authenticity of the of the portable consumer device in response to the comparison of the detected EMF signature to the stored EMF signature.

19. A portable consumer device comprising:
a substrate layer; and
a conductive brittle material layer disposed in a grid pattern on the substrate layer,
wherein the conductive brittle material layer comprises intentionally created unique and random cracked patterns and electrical leads.

20. A method of using the portable consumer device of claim 19 to authenticate a user account comprising:
receiving the portable consumer device in an access device;

inducing an electrical signal signature in the conductive brittle material layer by applying a magnetic field to the portable consumer device;

detecting the electrical signal signature at the electrical leads;

retrieving a user account identifier and a stored electrical signal signature associated with the user account identifier;

comparing the detected electrical signal signature to the stored electrical signal signature; and determining the authenticity of the of the portable consumer device in response to the comparison of the detected electrical signal signature to the stored electrical signal signature.

* * * * *